United States Patent [19]
Welker et al.

[11] Patent Number: 6,135,132
[45] Date of Patent: Oct. 24, 2000

[54] VALVE SEAT ARRANGEMENT

[75] Inventors: Paul E. Welker; Michael J. Mullally, both of Clifton Springs, N.Y.

[73] Assignee: ValveTech, Inc., Phelps, N.Y.

[21] Appl. No.: 08/868,601

[22] Filed: Jun. 4, 1997

[51] Int. Cl.$^7$ ...................................................... F16L 55/18
[52] U.S. Cl. ............................ 137/15; 137/315; 251/360; 251/362
[58] Field of Search ...................... 137/15, 315; 251/359, 251/360, 362

[56] References Cited

U.S. PATENT DOCUMENTS

| | | |
|---|---|---|
| 659,644 | 10/1900 | Bradley . |
| 1,959,068 | 5/1934 | Stoll ........................................ 251/359 |
| 2,621,011 | 12/1952 | Smith . |
| 2,744,539 | 5/1956 | Jones . |
| 2,786,645 | 3/1957 | Ralston . |
| 2,815,187 | 12/1957 | Hamer . |
| 2,925,994 | 2/1960 | Downs et al. . |
| 3,335,999 | 8/1967 | Lowrey . |
| 3,479,004 | 11/1969 | Brumm ................................. 251/362 |
| 4,146,092 | 3/1979 | Upton . |
| 4,376,526 | 3/1983 | Freeman . |
| 4,431,021 | 2/1984 | Scaramucci . |
| 4,519,582 | 5/1985 | Freeman . |
| 5,150,879 | 9/1992 | Mullally . |
| 5,374,029 | 12/1994 | Bailey . |

FOREIGN PATENT DOCUMENTS

| | | |
|---|---|---|
| 5044 | of 1892 | United Kingdom ................... 251/362 |
| 201869 | 8/1923 | United Kingdom . |

*Primary Examiner*—A. Michael Chambers
*Attorney, Agent, or Firm*—Eugene Stephens & Associates

[57] ABSTRACT

A valve seat arrangement that uses a TEFLON valve seat. The seat is held in place and kept from cold flowing in undesired ways by an outlet guide and a retainer. The valve seat arrangement is assembled using interference fits to avoid damage to the TEFLON seat. To overcome technical difficulties associated with the interference fit, a particular method of assembly is used. Specifically, the seat is heated and mounted on the outlet guide. Once the guide/seat assembly returns to ambient temperature, it is immersed in liquid nitrogen to force it to shrink. After removing the guide/seat assembly from the liquid nitrogen, the retainer is mounted thereon and the assembly is allowed to return to ambient temperature, thereby achieving another interference fit. If the retainer were heated to force it to expand, its temperature upon mounting on the seat would damage or destroy the seat, causing leakage through the seat.

35 Claims, 4 Drawing Sheets

VALVE SEAT ARRANGEMENT

TECHNICAL FIELD

Our invention relates to the field of valves. More specifically, our invention relates to valve seats in poppet valves, particularly those used in spacecraft dual-fuel thruster fuel control systems.

BACKGROUND OF THE INVENTION

Valves designed for use in spacecraft must endure great environmental extremes. The valves must be extremely reliable, yet must be lightweight. Such valves experience much shock and vibration during launch of the spacecraft, as well as extremes in temperature. The fluids the valves control are often extremely corrosive, requiring the use of special materials. Seals are particularly vulnerable since they are often made from resinous or elastomeric material that is subject to swelling or deteriorates when exposed to these fluids.

Dual-fuel thruster systems for spacecraft typically use corrosive fuels such as hydrazine, monomethylhydrazine, and nitrogen tetroxide, an extremely unfriendly substance that is incompatible with most materials used to make valve seals. Tetrafluoroethylene, sold under the trade name TEFLON by DuPont, is unaffected by nitrogen tetroxide, however, making TEFLON a strong candidate for use in the manufacture of valve seals. Unfortunately, TEFLON has other properties that make it difficult to use in an environment in which parts cannot be replaced.

TEFLON is not resilient and has no shape memory. As a result, deformations and damage are permanent and cumulative, leading to leakage when TEFLON is used to make seals and/or sealing valve seats. One source of deformation is the shock and vibration of launch. Deformations also can result from engagement between a poppet and a TEFLON valve seat.

Additional properties of TEFLON that cause problems are its tendency to flow under load ("cold flow") and its high coefficient of thermal expansion. Any load applied to a TEFLON valve seat can cause deformations of the seat and result in leakage. The high coefficient of thermal expansion results in sensitivity to changes in temperature. Even a small change in temperature can result in expansion or shrinkage of a TEFLON valve seat that can cause leakage.

Thus, while valve designers use TEFLON valve seats because of its compatibility with corrosive chemicals, its other properties render such use problematic. There is a need for a TEFLON valve seat arrangement that minimizes the likelihood of deformation of the seat from shock, vibration, and cold flow. There is also a need for a TEFLON valve seat that limits exposure of the seat to changes in temperature that can cause undesirable expansion and contraction of the seat. Further, there is a need for a valve seat that reduces or eliminates leakage ordinarily resulting in the natural deformation caused by contact between the poppet and the seat.

Most prior art valves using TEFLON as a sealing material hold the TEFLON parts in place with threaded retainers. As they are rotated during assembly, the threaded parts slide against the TEFLON parts, causing pitting, stretching, and other deformations of the TEFLON parts, increasing the possibility of leakage through the seal. Additionally, the assembled threaded parts place a load on the TEFLON, causing cold flow of the TEFLON that can lead to improper mating of parts and further leakage. While the amount of leakage caused by such damage and cold flow may be acceptable in the applications for which these prior art valves are designed, such leakage is not acceptable in dual-fuel thruster systems for spacecraft. Consequently, there is a need for a sealing valve seat arrangement using TEFLON that is not assembled with threads and that allows extremely low leakage.

While an interference fit would be preferred to avoid damaging the TEFLON seat, the properties of TEFLON cause problems when such an interference fit is actually attempted. For example, when pressing the TEFLON into position, the TEFLON will tear at the interface between the metal and the TEFLON, resulting in leakage paths. The annealing temperature for TEFLON is on the order of 400° F., and TEFLON has a large coefficient of thermal expansion. These properties make it easy to expand the TEFLON so that it can be shrunk-fit onto a metal piece. However, to achieve a similar interference fit of a second piece of metal over the TEFLON seat, the metal piece must be heated to a temperature ranging from 420° F. to 600° F., depending on the exact type of metal used to make the metal piece and the desired amount of interference. Thus, the second metal piece would be heated beyond the annealing temperature of the TEFLON seat, and possibly beyond its melting point, altering the properties of the seat, if not outright destroying it. There is a need, therefore, for a method of making a valve seat arrangement using a TEFLON seat where the parts are assembled using an interference fit but without exposing the seat to damaging heat.

Additionally, with most prior art arrangements, a small indentation results when the poppet contacts the seat. If the poppet is not correctly guided, the poppet will create overlapping indentations, resulting in leakage. Thus, there is a need for a valve seat arrangement in which the poppet is properly guided to prevent the formation of such overlapping indentations.

SUMMARY OF THE INVENTION

Our invention provides a sealing valve seat arrangement using a TEFLON seat that allows extremely low leakage. The parts are assembled without threads using a novel interference fit method, avoiding the damage that thread use ordinarily does to TEFLON sealing members. Further, our invention greatly restricts TEFLON cold flow so that the low leakage of the valve seat arrangement can be maintained for a greater period. We also minimize deformation from shock and vibration, and we limit the ways the TEFLON can change from variations in temperature.

We shape the seat, its supporting piece, and its retainer so that the TEFLON of the seat can cold flow substantially only toward the poppet that engages the seat. As a result, any cold flow of the seat only moves the engagement point of the seat and poppet in the direction of motion of the poppet. We also include grooves in the surfaces of the supporting piece and the retainer to provide a more secure engagement of the seat. The grooves also create a more labyrinth-like leak path around the seat, reducing leakage.

The seat is shrunk-fit on its supporting piece in the usual manner, but the interference fit of the seat retainer cannot be performed the same way, as discussed above. We overcome the interference fit problem by immersing the seat and its supporting piece in liquid nitrogen to contract them. This allows us to place the retainer over the seat after removing the assembly from the liquid nitrogen. As the seat assembly warms, the seat expands into the retainer, creating an interference fit without exposing the seat to potentially damaging heat. Our resulting valve seat arrangement provides excellent poppet mating and sealing characteristics, far superior to valves assembled with threads. An additional benefit of our invention is that, because the seat has not been forced over the metal, there are no scratches in the seat that could result in leak paths.

DESCRIPTION OF THE INVENTION

Figure 5:
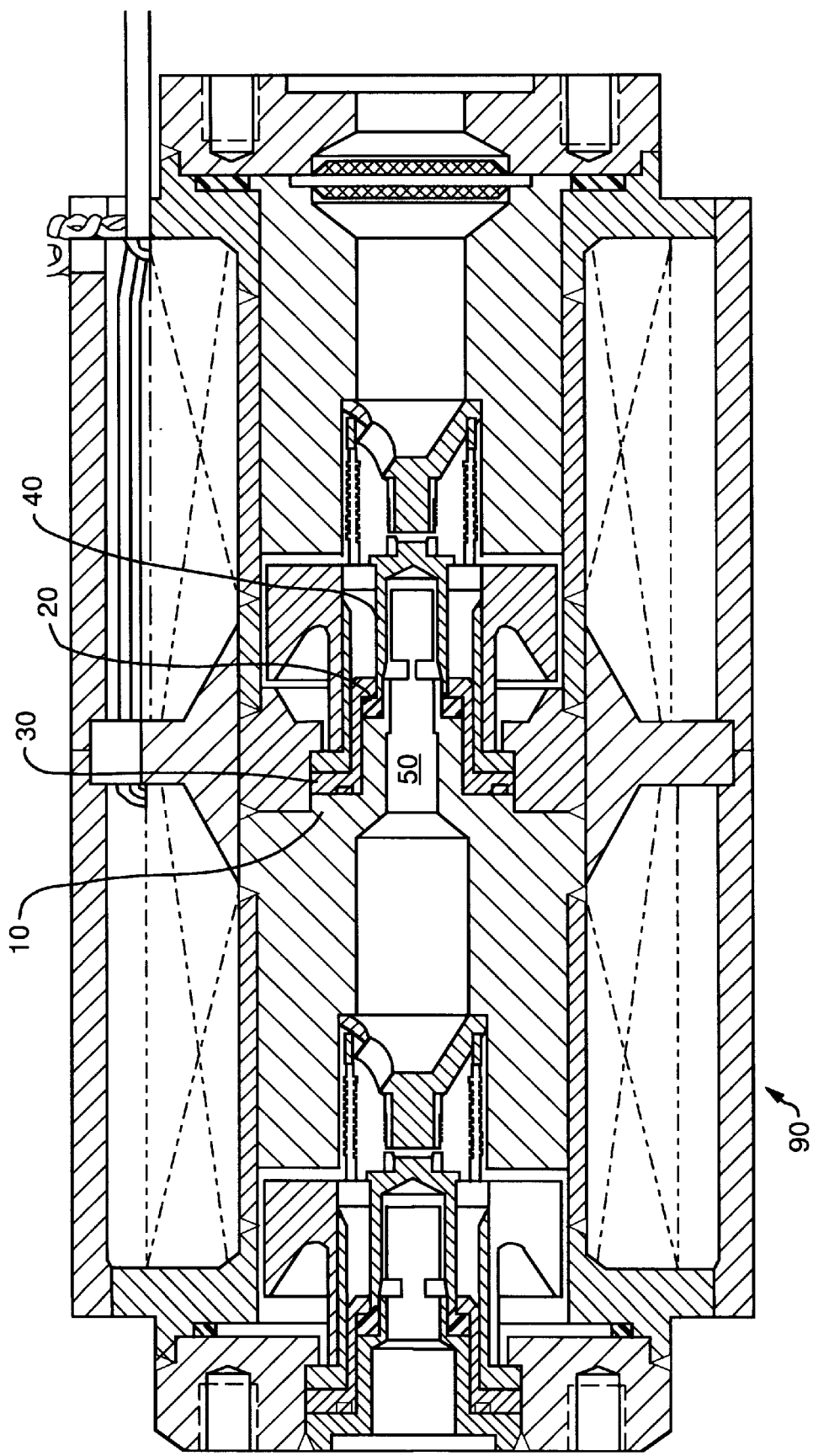
FIG. 5 shows a solenoid valve in which the invention can be used.

Our invention is particularly suited for poppet solenoid type valves such as the solenoid valve 90 shown in FIG. 5, but can be used in any suitable valve that requires extremely low leakage and high reliability.

In the preferred embodiment as shown in FIGS. 1 and 3–5, our invention comprises three major components: an outlet guide 10, a seat 20, and a retainer 30. The outlet guide 10 supports the seat 20 and also provides a conduit 50 for the valve 90 and a guide portion 16 for guiding the valve poppet 40. The outlet guide 10 is generally annular and preferably includes three sections 11, 12, 13 of progressively smaller outer diameters with first and second steps 14, 15 separating the sections. The second section 12 engages the retainer 30, which also abuts the face of the first step 14 of the outlet guide 10. The third section 13 and the face of the second step 15 support and constrain the seat 20 in the final assembly. The outer surface of the third section 13 and the face of the second step 15 preferably include grooves 17 for positively securing the seat 20 as will be explained in more detail below.

The seat 20 itself is also generally annular with a first section 21 and a step 25 to a second section 22 of reduced outer diameter. The second section 22 can instead have a reduced inner diameter as compared to the first section 21, though this would require a more complex shape for the outlet guide 10. The end 24 of the first section 21 of the seat 20 abuts the second step face 15 of the outlet guide 10. The second section 22 of the seat 20 preferably extends along the outlet guide 10 when assembled and provides a seat engagement surface 26 at its tip 23.

The retainer 30 is generally annular, but includes a rim 33 that engages the step 25 of the seat 20 to hold the seat 20 in place. As with the outlet guide 10, the retainer 30 has three sections, the second section 32 having a smaller outer diameter than the first section 31, the third section 33 having a smaller inner diameter than the second section 32 and comprising the rim 33. Two steps 34, 35 separate the sections: a first step 34 from the outer diameter of the first section 31 to the outer diameter of the second section 32; and a second step 35 from the inner diameter of the second section 32 to the inner diameter of the third section 33 to form the rim 33. The first and second sections 31, 32 of the retainer 30 engage the second section 12 of the outlet guide 10. The end 36 of the first section 31 abuts the first step 14 of the outlet guide 10, and the second section 32 also engages the first section 21 of the seat 20. The rim 33 of the retainer 30 engages the step 25 and second section 22 of the seat 20. Grooves 37 can be provided on the inner surface of the second section 32 and on the surface of the second step 35 of the retainer 30 to enhance engagement between the retainer 30 and the seat 20.

Once the valve seat arrangement 1 is assembled, the outlet guide 10 and the retainer 30 cooperate to prevent flow of the seat material in any direction but toward the poppet 40 that engages the seat 20. While flow of the seat material will change the point along the direction of motion of the poppet 40 at which the poppet 40 engages the seat 20, the flow will not alter the point on the seat engagement surface 26 at which the poppet 40 engages the seat 20. Additionally, the load applied to the seat engagement surface 26 by the poppet 40 tends to hold the seat material in its proper place, counteracting flow toward the poppet 40. Thus, the sealing properties of the valve seat 20 are maintained even where cold flow occurs.

In the preferred embodiment, the guide portion 16 of the outlet guide 10 is important to the sealing integrity of the seat 20 since it ensures consistent alignment of the poppet 40 and proper engagement of the poppet engagement surface 41 with the tip 23 of the seat 20. The guide portion 16 comprises an annulus attached to the third section 13 of the outlet guide 10 into the bore of a solenoid, such as the solenoid 90 shown in FIG. 5. The guide portion 16 is sized to have a very tight tolerance within the poppet 40 mounted thereon. The tight tolerance assures that the poppet 40 follows substantially the same path every time it travels along the guide 16. Preferably, the guide 16 is long enough relative to the poppet 40 that cocking of the poppet 40 within the solenoid bore is minimized, further ensuring that the poppet 40 travels substantially the same path with each engagement of the seat 20. Variations of our preferred arrangement could conceivably be used to ensure consistent poppet 40 alignment and still be within the scope of our invention.

Figure 2:
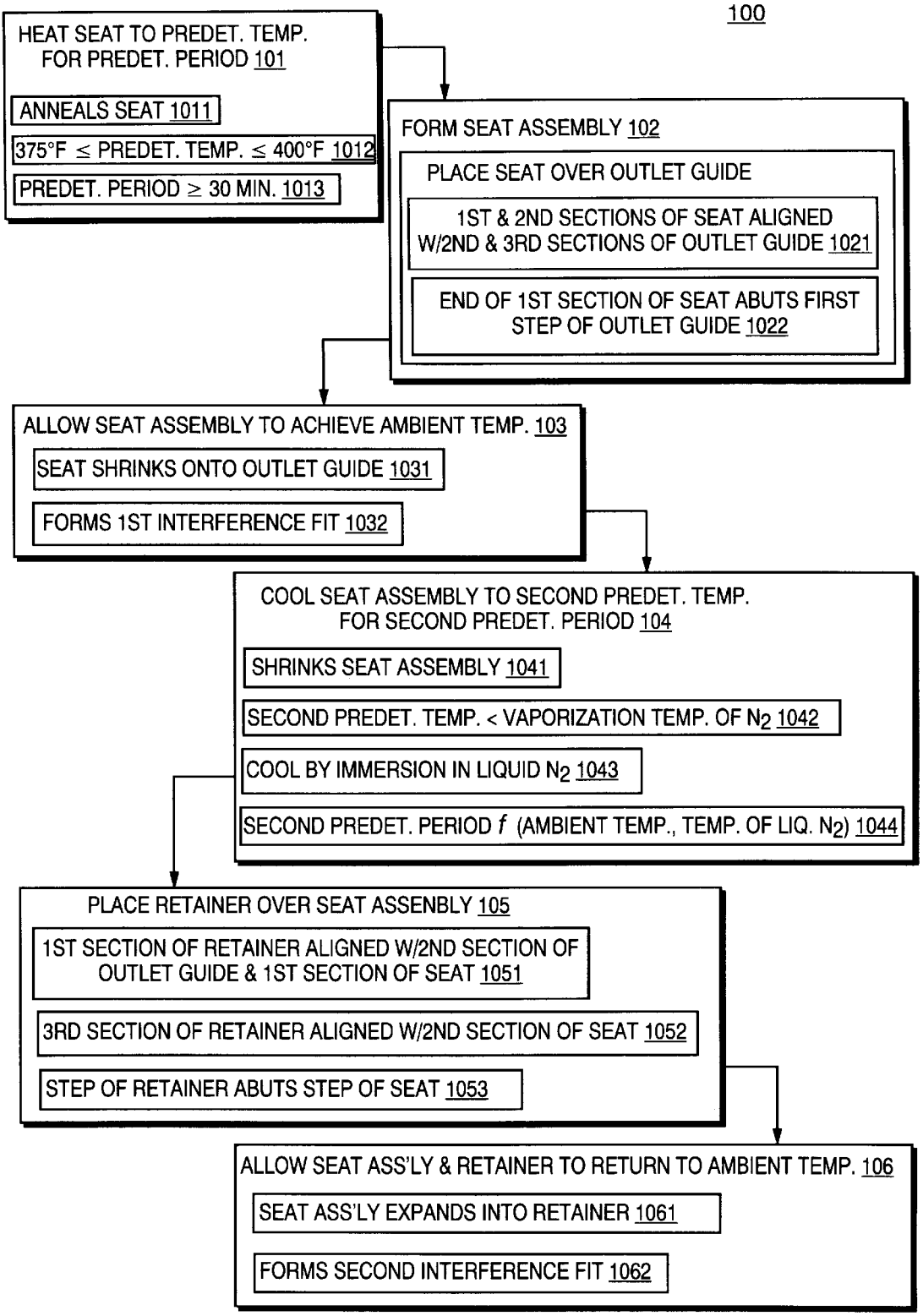
FIG. 2 is a flow chart schematically illustrating the method of making the instant invention.

As mentioned above, the assembly of our invention involves two interference fits: one between the outlet guide 10 and the seat 20, and one between the seat/guide assembly and the retainer 30. As was also mentioned above, the retainer 30 cannot be heated for its interference fit without damaging or destroying the valve seat 20. We have therefore developed a particular preferred method of assembling our invention 100, shown schematically in FIG. 2, that allows the interference fits to be achieved with no damage to the valve seat 20. Preferably, the amount of interference used in the interference fits minimizes load on the seat 20, thus preventing cold flow of the preferred TEFLON seat 20.

Figure 3:
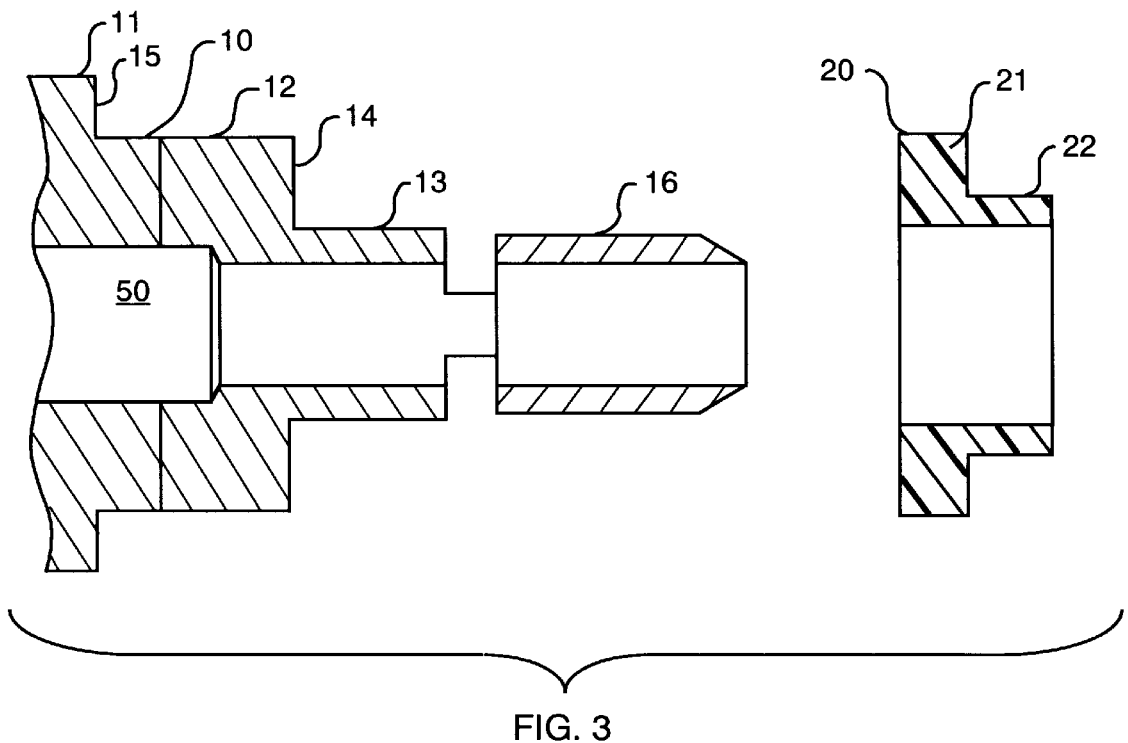
FIG. 3 shows the outlet guide and seat of the invention before they are assembled.

First, as indicated by box 101 and its sub-parts, we heat the seat 20 for a predetermined period and at a predetermined temperature to expand the seat 20 beyond the designed interference. For the preferred TEFLON seat 20, the heating process is also an annealing treatment (box 1011) that gives the TEFLON better sealing and durability qualities. Because TEFLON has a high coefficient of thermal expansion, the preferred annealing temperature of 375° F.–400° F. (box 1012) causes adequate expansion of the seat 20. The TEFLON seat 20 is preferably maintained at the elevated temperature for at least 30 minutes to an hour (box 1013) and placed on the outlet guide 10 to form the seat/guide assembly (box 102 and its sub-parts). FIG. 3 shows the seat 20 and outlet guide 10 as they would appear after heating of the seat 20, but before placement of the seat 20 on the outlet guide 10. The seat 20 is placed on the outlet guide 10 such that the first and second sections 21, 22 of the seat 20 are aligned with the second and third sections 12, 13 of the outlet guide 10, with the end of the first section 21 of seat 20 abutting the first step 14 of the outlet guide 10 (boxes 1021–1023). The assembly is then allowed to return to ambient temperature (box 103). The seat 20 shrinks and becomes firmly attached to the outlet guide 10 by an interference fit (boxes 1031 and 1032). If grooves 17 are included in the surfaces of the third section 13 and the second step 15 of the outlet guide 10, the preferred TEFLON seat 20 flows into the grooves 17 to provide a more secure attachment.

Figure 1:
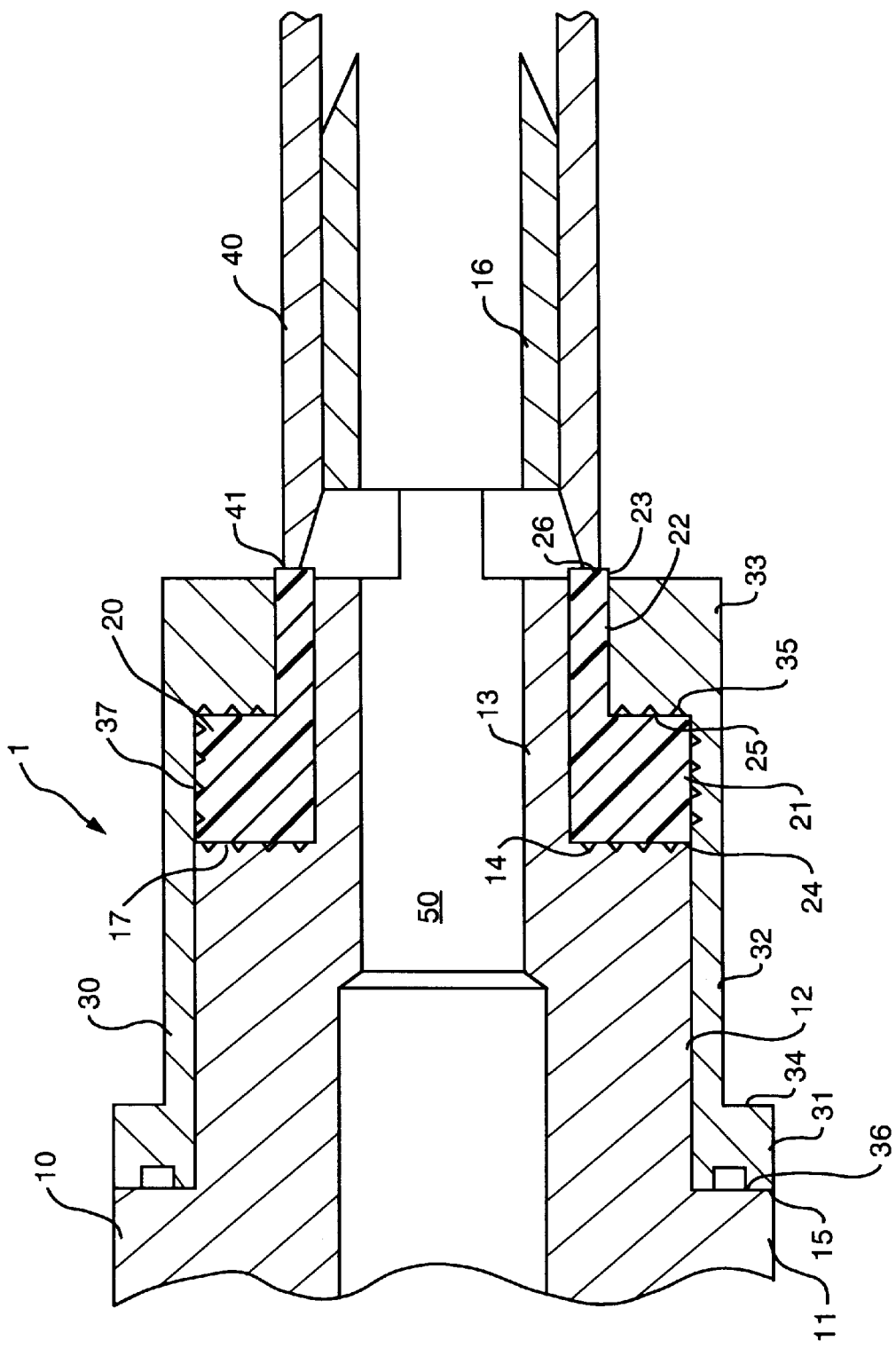
FIG. 1 is a cross section of the valve seat arrangement of the instant invention taken along a longitudinal axis of the arrangement.
Figure 4:
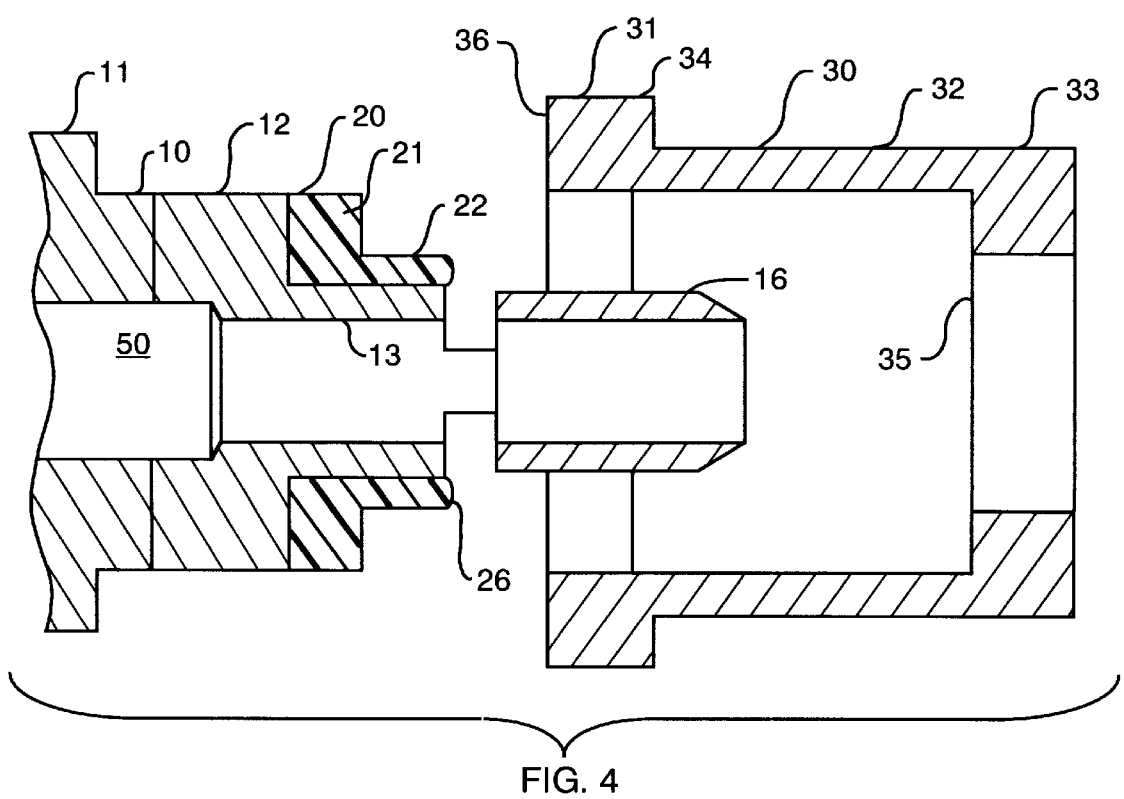
FIG. 4 shows the outlet guide and seat of the invention after they have been assembled to form the seat/guide assembly and shows the retainer before it has been placed on the seat/guide assembly.

After the seat/guide assembly cools to ambient temperature, it is cooled to a second predetermined temperature for a second predetermined period to shrink the assembly (boxes 104 and 1041–1044). We prefer to force the seat assembly to contract by immersing it in liquid nitrogen (box 1043). The exact amount of time that the seat assembly is left in the liquid nitrogen depends on the ambient temperature and the temperature of the liquid nitrogen (box 1044). However, a good gauge of the proper amount of cooling and consequent shrinkage of the seat assembly is the termination of bubbling from the seat assembly. Termination of bubbling indicates that the seat assembly has cooled below the vaporization temperature of nitrogen (box 1042), which should cause adequate shrinkage of the seat assembly. The assembly is then removed from the liquid nitrogen and the retainer 30 is placed on the seat/guide assembly (box 105). FIG. 4 shows the seat/guide assembly and retainer 30 as they would appear just before the retainer 30 is placed on the seat/guide assembly. Preferably, as indicated in boxes 1051–1053 and as shown in FIGS. 1 and 5, the retainer 30 abuts the second step 15 of the outlet guide 10; the first and second sections 31, 32 of the retainer 30 are aligned with and engage the second section 12 of the outlet guide 10 and the first section 21 of the seat 20; and the third section or rim 33 of the retainer 30 abuts the step 25 of the seat 20 with retainer step 35. The third section 33 of the retainer also engages the second section 22 of the seat 20. The parts are then allowed to return to ambient temperature (box 106), causing the seat assembly to expand into the retainer 30 (box 1061). As with the seat 20 and outlet guide 10, the retainer 30 is manufactured with enough interference to ensure its secure attachment by an interference fit on the seat/guide assembly when the assembly returns to ambient temperature (box 1062). The completed valve seat 20 arrangement is washed with alcohol once it reaches ambient temperature to remove condensation and then vacuum dried for 30 minutes to an hour. If grooves 37 are included on the inner surface of the second section 32 of the retainer 30, the preferred TEFLON seat 20 flows into the grooves 27 to provide a more secure connection between the retainer 30 and the seat 20.

The method of manufacture 100 is important since it allows assembly of the valve seat arrangement without threads, preserving the integrity of the seat 20 even when the seat 20 is made from TEFLON. The seat/guide assembly is cooled in liquid nitrogen because the annealing temperature of TEFLON is close to or below the temperature to which the retainer 30 would need to be heated for an ordinary shrink fit. Though the temperature to which the retainer 30 must be heated is dependent on the exact amount of expansion required and the particular material used, the temperature can be as low as 420° F. or as high as 2100° F. Thus, damage to and leakage through the seat 20 could result if the retainer 30 were heated for a shrink fit.

PARTS LIST

1 Valve seat arrangement
10 Outlet guide
11 First section of outlet guide
12 Second section of outlet guide
13 Third section of outlet guide
14 First step of outlet guide between second and third sections
15 Second step of outlet guide between first and second sections
16 Guide for poppet
17 Grooves of outlet guide
20 Sealing valve seat
21 First section of valve seat
22 Second section of valve seat
23 Tip or end of valve seat
24 End of first section of valve seat
25 Step between first and second sections of valve seat
26 Seat engagement surface
30 Retainer
31 First section of retainer
32 Second section of retainer
33 Third section or rim of retainer
34 First step between first and second sections of retainer
35 Second step between second and third sections of retainer
36 End of first section of retainer
37 Grooves of retainer
40 Poppet
41 Engagement surface of poppet
50 conduit
90 solenoid valve
100 Method of assembly
101 Step of heating seat
1011 Indication that step of heating seat anneals seat
1012 Sub-step of controlling temperature within specific range
1013 Sub-step of maintaining elevated temperature for at least a minimum predetermined period
102 Step of forming seat assembly
1021 Sub-step of placing seat over outlet guide
1022 Sub-step of aligning first and second sections of seat with second and third sections of outlet guide
1023 Sub-step of placing seat on outlet guide so that first section of seat abuts second step of outlet guide
103 Step of allowing seat to achieve ambient temperature
1031 Indication that step of allowing set to achieve ambient temperature causes seat to shrink onto outlet guide
1032 Indication that first interference fit results from allowing seat to reach ambient temperature
104 Step of cooling seat assembly
1041 Indication that cooling shrinks seat assembly
1042 Sub-step of controlling temperature below particular temperature
1043 Sub-step of immersing in liquid nitrogen
1044 Sub-step of maintaining reduced temperature
105 Step of placing retainer over seat assembly
1051 Sub-step of aligning first section of retainer with first sections of outlet guide and seat
1052 Sub-step of aligning second section of retainer with second section of seat
1053 Sub-step of placing retainer on seat assembly so that retainer step abuts seat step
106 Step of allowing seat assembly and retainer to return to ambient temperature
1061 Indication that seat assembly expands into retainer
1062 Indication that second interference fit results from expansion of seat assembly into retainer

We claim:

1. A valve seat arrangement comprising:
   a. a generally annular seat comprising a first section and a second section, the second section having a smaller outer diameter than the first section and extending longitudinally away from the first section to provide an engagement surface for a poppet at an end of the second section;
   b. a generally annular outlet guide supporting the seat via a first interference fit and comprising first, second, and third sections, the second section having a smaller outer diameter than the first section and the third section having a smaller outer diameter than the first and second sections, the seat being supported on the third section and abutting a step between the second and third section; and
   c. a generally annular retainer having first, second, and third sections, the third section having a smaller inner diameter than the second section, the first section engaging the first section of the outlet guide, the second section engaging the second section of the outlet guide and the first section of the seat, and the third section engaging the second section of the seat, a step between the second and third sections of the retainer engaging a step between the first and second sections of the seat, the retainer being secured to the outlet guide and retaining the seat via a second interference fit.

2. The valve seat arrangement of claim 1 wherein the valve seat arrangement is assembled by:
   A. Heating the seat to a first predetermined temperature for a first predetermined period, thereby expanding the seat by a first predetermined amount;
   B. Forming a seat assembly by placing the seat over the outlet guide such that the first and second sections of the seat are aligned with the second and third sections of the outlet guide, respectively, with an end of the first section of the seat in engagement with the step between the second and third sections of the outlet guide;
   C. Allowing the seat assembly to achieve an ambient temperature, the seat thereby cooling and contracting such that the first interference fit is formed, thus securing the seat to the outlet guide;
   D. Cooling the seat assembly to a second predetermined temperature for a second predetermined period, thereby causing the seat assembly to contract by a second predetermined amount;
   E. Placing the retainer over the seat assembly such that the first section of the retainer is aligned with the first sections of the outlet guide and the seat, and the second section of the retainer is aligned with the second section of the seat, the step between the second and third sections of the retainer engaging the face of the step of the seat; and
   F. Allowing the seat assembly and retainer to return to the ambient temperature, thereby causing the seat assembly to expand into the retainer, thereby forming the second interference fit by which the retainer holds the seat firmly in position on the outlet guide.

3. The valve seat arrangement of claim 2 wherein the step of heating the seat comprises the step of conducting an annealing treatment of the seat.

4. The valve seat arrangement of claim 3 wherein the seat is made from tetrafluoroethylene, and the step of conducting an annealing treatment comprises the steps of heating the seat to a temperature in the range of between 375° F. and 400° F. and keeping the seat at the temperature for at least 30 minutes.

5. The valve seat arrangement of claim 2 wherein an outer surface of the third section of the outlet guide bears grooves into which the seat flows during the steps of allowing the seat assembly to achieve ambient temperature and allowing the seat assembly and retainer to achieve ambient temperature, the grooves thereby providing a positive engagement of the seat.

6. The valve seat arrangement of claim 2 wherein the step between the second and third sections of the outlet guide bears grooves into which the seat flows during the steps of allowing the seat assembly to achieve ambient temperature and allowing the seat assembly and retainer to achieve ambient temperature, the grooves thereby providing a positive engagement of the seat.

7. The valve seat arrangement of claim 2 wherein an inner surface of the retainer bears grooves into which the seat flows during the step of allowing the seat assembly and retainer to achieve ambient temperature, the grooves thereby providing a positive engagement of the seat.

8. The valve seat arrangement of claim 2 wherein the outlet guide includes a guide that supports a poppet for selective engagement with the seat.

9. A valve seat arrangement comprising:
   a. a generally annular seat comprising a first section and a second section, the second section having a smaller outer diameter than the first section and extending longitudinally away from the first section to provide an engagement surface for a poppet at an end of the second section;
   b. a generally annular outlet guide supporting the seat via a first interference fit and comprising first, second, and third sections, the second section having a smaller outer diameter than the first section and the third section having a smaller outer diameter than the first and second sections, the seat being supported on the third section and abutting a step between the second and third sections; and
   c. a generally annular retainer having first, second, and third sections, the third section having a smaller inner diameter than the second section, the first section engaging the first section of the outlet guide, the second section engaging the second section of the outlet guide and the first section of the seat, and the third section engaging the second section of the seat, a step between the second and third sections of the retainer engaging a step between the first and second sections of the seat, the retainer being secured to the outlet guide and retaining the seat via a second interference fit; and
   assembled according to a method including the steps of:
   A. Heating the seat to a first predetermined temperature for a first predetermined period, thereby expanding the seat by a first predetermined amount;
   B. Forming a seat assembly by placing the seat over the outlet guide such that the first and second sections of the seat are aligned with the second and third sections of the outlet guide, respectively, with an end of the first section of the seat in engagement with the step between the second and third sections of the outlet guide;
   C. Allowing the seat assembly to achieve an ambient temperature, the seat thereby cooling and contracting such that the first interference fit is formed, thus securing the seat to the outlet guide;
   D. Cooling the seat assembly to a second predetermined temperature for a second predetermined period, thereby causing the seat assembly to contract by a second predetermined amount;

E. Placing the retainer over the seat assembly such that the first section of the retainer is aligned with the first sections of the outlet guide and the seat, and the second section of the retainer is aligned with the second section of the seat, the step between the second and third sections of the retainer engaging the face of the step of the seat; and F. Allowing the seat assembly and retainer to return to the ambient temperature, thereby causing the seat assembly to expand into the retainer, thereby forming the second interference fit by which the retainer holds the seat firmly in position on the outlet guide.

10. A method of assembling a valve seat arrangement including the steps of:

A. Heating a seat to a first predetermined temperature for a first predetermined period, thereby expanding the seat by a first predetermined amount;

B. Forming a seat assembly by placing the seat over an outlet guide;

C. Allowing the seat assembly to achieve an ambient temperature, the seat thereby cooling and contracting such that a first interference fit is formed, thus securing the seat to the outlet guide;

D. Cooling the seat assembly to a second predetermined temperature for a second predetermined period, thereby causing the seat assembly to contract by second predetermined amount;

E. Placing a retainer over the seat assembly; and

F. Allowing the seat assembly and retainer to return to the ambient temperature, thereby causing the seat assembly to expand into the retainer, thereby forming a second interference fit by which the retainer holds the seat firmly in position on the outlet guide.

11. A valve seat arrangement comprising:

a. a seat mounted on an outlet guide by a first interference fit;

b. a retainer mounted on the outlet guide and the seat by a second interference fit, the retainer holding the seat in place; and c. a poppet engagement surface of the seat formed at an end surface of the seat, the poppet engagement surface being located between an end surface of the retainer and an end surface of the outlet guide.

12. The valve seat arrangement of claim 11 wherein the seat comprises a first section, a second section substantially narrower than the first section, and a step between the first and second sections, a face of the step engaging the retainer.

13. The valve seat arrangement of claim 12 wherein the poppet engagement surface is an end surface of the second section.

14. The valve seat arrangement of claim 12 wherein the first section is engaged and substantially held in place by the retainer and the outlet guide.

15. The valve seat arrangement of claim 11 wherein the retainer comprises first, second, and third sections, the third section having a smaller inner diameter than the first and second sections and engaging the seat.

16. The valve seat arrangement of claim 15 wherein the first and second sections engage the outlet guide.

17. The valve seat arrangement of claim 15 wherein the second section engages the seat.

18. The valve seat arrangement of claim 11 wherein the outlet guide comprises first, second, and third sections, the third section supporting the seat.

19. The valve seat arrangement of claim 18 wherein the second section of the outlet guide engages the retainer.

20. The valve seat arrangement of claim 11 wherein the first interference fit is formed by a method including the steps of heating the seat to a predetermined heating temperature, placing the seat on the outlet guide, and allowing the seat and outlet guide to return to an ambient temperature, thereby allowing the seat to shrink and become attached to the outlet guide.

21. The valve seat arrangement of claim 20 wherein the seat is made from tetrafluoroethylene, and the predetermined heating temperature falls in the range of between 375° F. and 400° F.

22. The valve seat arrangement of claim 21 wherein the step of heating the seat to a predetermined heating temperature includes keeping the seat at the predetermined heating temperature for a period of at least 30 minutes.

23. The valve seat arrangement of claim 22 wherein keeping the seat at the predetermined heating temperature for the period of at least 30 minutes comprises an annealing treatment of the seat.

24. The valve seat arrangement of claim 11 wherein the second interference fit is formed by a method including the steps of cooling the seat and the outlet guide below a predetermined cooling temperature, placing the retainer over the seat and the outlet guide, and allowing the seat and outlet guide to return to an ambient temperature, thereby allowing the seat and outlet guide to expand into the retainer, causing the retainer to be firmly attached to the seat and the outlet guide.

25. The valve seat arrangement of claim 24 wherein the predetermined cooling temperature is a vaporization temperature of nitrogen and the step of cooling includes immersing the seat and the outlet guide in liquid nitrogen.

26. The valve seat arrangement of claim 25 wherein the step of immersing the seat and the outlet guide includes immersing them in the liquid nitrogen until bubbling from the seat and the outlet guide stops, thereby indicating that the seat and the outlet guide have been cooled below the vaporization temperature of nitrogen.

27. The valve seat arrangement of claim 25 wherein the method of forming the second interference fit further includes rinsing the seat and the outlet guide after they have returned to the ambient temperature to remove condensation.

28. The valve seat arrangement of claim 27 wherein the step of rinsing the seat and the outlet guide includes rinsing them with alcohol.

29. The valve seat arrangement of claim 27 wherein the method of forming the second interference fit further includes vacuum drying the retainer, seat, and outlet guide for a predetermined period after they are rinsed.

30. The valve seat arrangement of claim 29 wherein the predetermined period is at least 30 minutes.

31. The valve seat arrangement of claim 11 wherein the outlet guide includes grooves in surfaces that engage the seat to enhance engagement between the outlet guide and the seat.

32. The valve seat arrangement of claim 11 wherein the retainer includes grooves in a surface that engages the seat to enhance engagement between the retainer and the seat.

33. The valve seat arrangement of claim 11 wherein the outlet guide includes a guide portion that supports and guides a poppet of a valve in which the valve seat arrangement is used such that the poppet engages substantially the same part of the poppet engagement surface of the seat substantially every time the poppet engages the poppet engagement surface, thereby reducing leakage through the valve seat.

34. The valve seat arrangement of claim 33 wherein the guide portion is long enough relative to the poppet that cocking of the poppet is minimized.

35. A valve seat arrangement including:
   a. a seat mounted on an outlet guide by a first interference fit;
   b. a retainer mounted on the outlet guide and the seat by a second interference fit, the retainer holding the seat in place; and
   c. a poppet engagement surface of the seat formed at an end surface of the seat, the poppet engagement surface being located between an end surface of the retainer and an end surface of the outlet guide; and assembled according to a method including the steps of:
   A. Heating a seat to a first predetermined temperature for a first predetermined period, thereby expanding the seat by a first predetermined amount;
   B. Forming a seat assembly by placing the seat over an outlet guide;
   C. Allowing the seat assembly to achieve an ambient temperature, the seat thereby cooling and contracting such that a first interference fit is formed, thus securing the seat to the outlet guide;
   D. Cooling the seat assembly to a second predetermined temperature for a second predetermined period, thereby causing the seat assembly to contract by a second predetermined amount;
   E. Placing a retainer over the seat assembly; and
   F. Allowing the seat assembly and retainer to return to the ambient temperature, thereby causing the seat assembly to expand into the retainer, thereby forming a second interference fit by which the retainer holds the seat firmly in position on the outlet guide.

* * * * *